United States Patent
Kogan et al.

(10) Patent No.: US 10,521,737 B2
(45) Date of Patent: Dec. 31, 2019

(54) ACTIVITY CENTRIC PROJECT MANAGEMENT TOOL

(75) Inventors: Sandra L. Kogan, Newton, MA (US); Eric M. Wilcox, Cambridge, MA (US); Charles R. Hill, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 3903 days.

(21) Appl. No.: 11/612,975

(22) Filed: Dec. 19, 2006

(65) Prior Publication Data

US 2008/0148159 A1 Jun. 19, 2008

(51) Int. Cl.
*G06Q 10/06* (2012.01)

(52) U.S. Cl.
CPC ................... *G06Q 10/06* (2013.01)

(58) Field of Classification Search
USPC ..................................... 705/7, 8, 9
See application file for complete search history.

(56) References Cited

U.S. PATENT DOCUMENTS

| | | | |
|---|---|---|---|
| 2002/0120489 A1 | 8/2002 | Matsuda et al. | |
| 2003/0004767 A1* | 1/2003 | Ohsaki | 705/7 |
| 2003/0120661 A1 | 8/2003 | Mets et al. | |
| 2003/0182172 A1* | 9/2003 | Claggett et al. | 705/9 |
| 2004/0030992 A1* | 2/2004 | Moisa et al. | 715/513 |
| 2004/0143477 A1 | 7/2004 | Wolff | |
| 2004/0143811 A1 | 7/2004 | Kaelicke et al. | |
| 2004/0267589 A1 | 12/2004 | Wallman | |
| 2005/0144529 A1 | 8/2005 | Gotz et al. | |
| 2006/0088144 A1* | 4/2006 | Mitchell et al. | 379/88.17 |
| 2007/0094068 A1* | 4/2007 | Muller | G06F 8/65 705/348 |
| 2007/0226204 A1* | 9/2007 | Feldman | 707/5 |
| 2008/0255918 A1* | 10/2008 | Madhavan | 705/9 |

OTHER PUBLICATIONS

Rabie, S., et al; Activity-Based User Interface for Network Management; 1989, IEEE.
Shi, Jonathan J.; Object-Oriented Technology for Enhancing Activity-Based Modeling Functionality; Proceedings of the 2000 Winter Simulation Conference.
Bardram; Jakob, et al; Real-time Collaboration in Activity-Based Architectures; Proceedings of the Fourth Working IEEE/FIP Conference on Software Architecture (WICSA '04).

* cited by examiner

*Primary Examiner* — Stephanie Z Delich
(74) *Attorney, Agent, or Firm* — Steven M. Greenberg, Esq.; Shutts & Bowen LLP

(57) ABSTRACT

Embodiments of the present invention address deficiencies of the art in respect to project management tools and provide a method, system and computer program product for an activity-centric project management tool. In one embodiment of the invention, an activity-centric project management tool data processing system can be provided. The system can include an activity-centric project management tool, one or more ad-hoc communications tools externally coupled to the activity-centric project management tool, and ad hoc communications activity objectification logic coupled to both the activity-centric project management tool and the ad-hoc communications tools. The logic can include program code enabled to integrate external ad-hoc communications among task nodes of an activity hierarchy modeling a project plan.

20 Claims, 2 Drawing Sheets

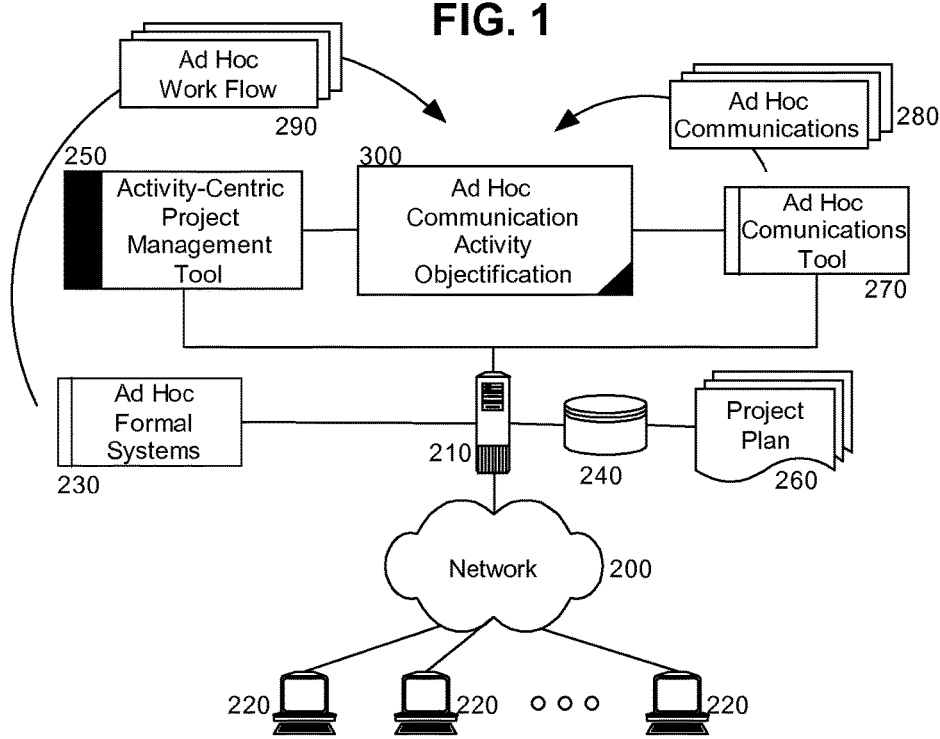

ACTIVITY CENTRIC PROJECT MANAGEMENT TOOL

BACKGROUND OF THE INVENTION

Field of the Invention

The present invention relates to the field of collaborative computing and more particularly to project management in a collaborative computing environment.

Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup whether co-located or geographically dispersed. No longer merely restricted to document sharing, the modern collaborative environment can include document libraries, chat rooms, video conferencing, application sharing, and discussion forums to name only a few. Notably, today's collaborative computing environments can be both synchronous or asynchronous.

A collaborative computing application enjoys substantial advantages over a more conventional, individualized computing application. Specifically, at present it is rare that a goal or milestone of any importance is entrusted and reliant upon a single person. In fact, most goals and objectives can be achieved only through the participation of a multiplicity of individuals and systems, each serving a specified role or roles in the process. Consequently, to provide computing tools designed for use only by one of the individuals in the process can be short sighted and can ignore important potential contributions lying among the other individuals involved in the process. Also to provide computing tools designed for use only by one of the individuals in the process can create substantially more work for each individual in the process where each goal, milestone or system must be manually checked to view updates and the most current information. This creates a labor intensive environment whereby each goal, milestone or system exponentially increases an individual's work effort.

Personal information managers, project management systems and workflow management systems represent three such computing applications which attempt to manage a process leading to an objective, leveraging the participation of many individuals in the process and standalone systems. Project management systems provide means for an individual or a group to define and track project stages, milestones, objectives, and resources with strictly-specified interdependencies. In a traditional project management system, the phases of a project can be defined from start to finish and a timeline can be generated for the project. These systems are also used to coordinate resources and people, and to define and manage milestones. Utilizing the timeline, it can be determined when particular phases of the project have been completed and when a subsequently scheduled phase of the project can begin.

In a project management tool, to the extent that the timing of one phase of the project changes, the remaining project phases can be adjusted to accommodate the changed timing. Similarly, if the project requires the use of limited resources, and the allocation of one such resource changes, the remaining project phases that depend on that resource can be adjusted to accommodate the reduction of that resource, and re-allocated based upon changing needs. A major strength of project management systems is their maintenance of these kinds of strict interdependencies. In addition, in many project management systems, particular people can be assigned to particular phases of the project.

Notwithstanding the foregoing, project management tools do not account for the actual nature of a coordinated set of collaborative tasks conducted by people, such as an activity. An activity, unlike a typical project or workflow, refers to objects, actions, and persons in the real world, and provides a computerized representation of selected aspects of those objects, actions, and persons. As is well known, human work is notoriously situational and changeable. Humans discover new aspects of problems, develop new understandings of constraints, adapt to changed conditions, and inform their colleagues about these new circumstances.

Regarding this changeable, re-interpretable, shared human work, conventional project management tools have failed to provide a flexible, collaborative computerized representation of a coordinated set of collaborative tasks and incorporate the realtime, live communication that takes place outside of the project management tools. Rather, project management tools provide mere shared representations of project components in which one user typically specifies a fixed set of components and their interdependencies for use by other users. Furthermore, in project management systems, other users are relegated to the task of updating not the interdependencies, but merely the status of the specified components within those strict interdependencies. Accordingly, project management tools provide a strictly enforced sequence of actions and keep records of deviations therefrom.

Modem project management tools further neglect change management, communication management and document management. Change management, communication management and document management universally takes place outside of the project management tool, in different computing systems and using various ad hoc tools for communication. End users, in consequence, rely strictly upon "heavy lifting" (and heavy cognitive load in terms or things that they have to remember to update or check) to incorporate ad hoc communications and relevant documents into a project management tool. In this regard, "heavy lifting" refers to the manual cutting and pasting of relevant information into a project plan in the project management tool.

BRIEF SUMMARY OF THE INVENTION

Embodiments of the present invention address deficiencies of the art in respect to project management tools and provide a novel and non-obvious method, system and computer program product for an activity-centric project management tool. In one embodiment of the invention, an activity-centric project management tool and data processing system can be provided. The system can include an activity-centric project management tool, one or more ad-hoc communications tools externally coupled to the activity-centric project management tool, such as e-mail messengers, instant messengers, bloggers, wikis and workflow management systems, and ad hoc communications activity objectification logic coupled to both the activity-centric project management tool and the ad-hoc communications tools. The logic can include program code enabled to integrate external ad-hoc communications among task nodes of an activity hierarchy modeling a project plan.

In another embodiment of the invention, a method for integrating external ad-hoc communications in a project plan in a project management tool can be provided. The method can include selecting an instance of an external ad-hoc communication, creating a task node for the selected instance, associating the instance of the external ad-hoc communication with task meta data in the task node, and inserting the task node under an associated task in a hierarchy of task nodes representative of a project plan. In one aspect of the embodiment, selecting an instance of an external ad-hoc communication can include selecting an instance of an externally produced instant message session, an externally produced screen sharing session, or an externally produced relationship requests for approval of a change. In the latter circumstance, a pop-up view can be rendered of a status of the instance of an externally produced relationship requests for approval of a change responsive to a selection of the instance of the externally produced relationship requests for approval of a change.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of an activity centric project management tool user interface;

FIG. 2 is a schematic illustration of an activity centric project management tool data processing system; and, FIG. 3 is a flow chart illustrating a process for incorporating ad hoc communications into an activity centric project management tool.

DETAILED DESCRIPTION OF THE INVENTION

Figure 3:
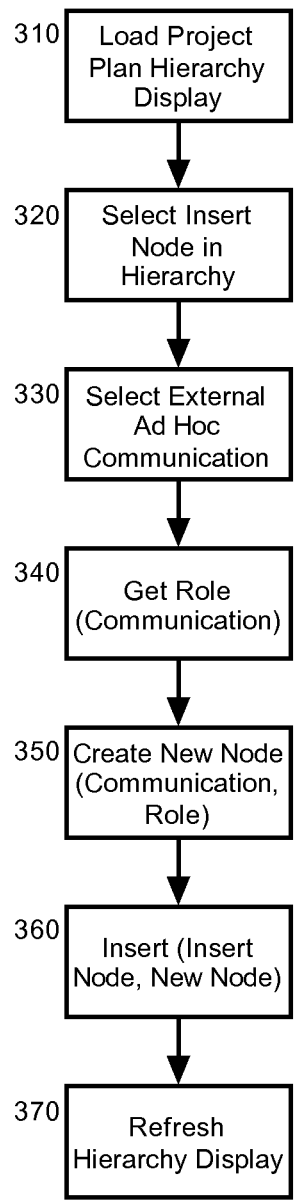

Embodiments of the present invention provide a method, system and computer program product for an activity centric project management tool. In accordance with an embodiment of the present invention, phases of a project including steps in each phase can be modeled as activities and tasks in an activity-centric hierarchy. Each activity and task in the activity-centric hierarchy can be associated with activity meta-data including a role to perform the corresponding activity or task. Further, liveness can be added to the activity and task as can presence awareness for collaborators associated with the activity and task. Finally, each activity or task further can be associated with a duration and a start date.

Importantly, external ad-hoc communications can be wrapped with activity meta-data and inserted directly into the activity-centric hierarchy in association with corresponding activities or tasks relating to the external ad-hoc communications. The external ad-hoc communications can include not only collaborative messages and communicative session logs, but also relationship interactions such as change requests. In this way, heavy lifting can be avoided in integrating external ad-hoc communications. Moreover, the external ad-hoc communications can be reflected directly in Gantt charts produced from the hierarchy for the activities and tasks of the activity-centric hierarchy providing greater context for associated activities and tasks.

In illustration, FIG. 1 is a pictorial illustration of an activity-centric project management tool user interface. The activity-centric project management tool user interface 110 can include a table of tasks 120 hierarchically ordered into nodes. The table of tasks 120 in the activity-centric project management tool user interface 110 also can include a duration 130 for each of the task 120, a start date 140 for each of the tasks 120, and a role 150 performing each of the tasks 120. Importantly, it will be recognized by the skilled artisan that a role as compared to a user provides greater flexibility in project management in that the performance of the task need not be limited to the availability of a single end user.

As shown in FIG. 1, one or more external ad-hoc communications can be incorporated directly in the hierarchy of tasks 120. Examples include chats, messages, screen-shares and relationship requests, to name a few. The external ad-hoc communications can be shown as any other node in the activity-centric hierarchy including corresponding activity meta-data—namely a role. With regard in particular to a relationship request, the inserted external ad-hoc communication can be rendered active such that selecting the relationship request in the hierarchy can result in a pop-up view 170 showing a current status for the relationship request. The other inserted instance of external ad-hoc communications also can be rendered active such that selecting an instance of an external ad-hoc communication in the hierarchy can result in a linkage to a view of the external ad-hoc communication.

Finally, a Gantt chart 160 can be provided within the activity-centric project management tool user interface 110. The Gantt chart 160 can be configured to demonstrate a project time line reflected by the hierarchy of tasks 120. Of importance, the Gantt chart 160 can be compared directly to the inserted external ad-hoc communications in the hierarchy so as to provide context for the Gantt chart 160. In further illustration, FIG. 2 is a schematic illustration of an activity centric project management tool data processing system.

The system can include a host computing platform 210 coupled to one or more client computing platforms 220 over a computer communications network 200. The host computing platform 210 can support the operation of an activity-centric project management tool 250 as well as one or more external ad-hoc communications tools 270—specifically collaborative computing tools such as screen sharing applications, messengers, and the like, and one or more ad hoc formal systems 230 such as a workflow system, document management system, productivity tool and the like. A data store 240 can be coupled to the host computing platform 210 and can include storage for one or more project plans 260, each project plan 260 providing a hierarchy of activity and task nodes modeling a corresponding project.

Each of the activity-centric project management tool 250, the ad-hoc communications tools 270 and the ad hoc formal systems 230 can be coupled to ad-hoc communication activity objectification logic 300. The ad-hoc communication activity objectification logic 300 can include program code enabled to wrap external ad-hoc communications 280 and external ad hoc work flows 290 with activity-centric meta-data and to insert a resulting node into the activity hierarchy for a corresponding one of the project plans 260. In this way, the external ad-hoc communications 280 and the external ad hoc workflows 290 can be viewed in context of the nodes of the activity hierarchy for the corresponding one of the project plans 260.

In yet further illustration, FIG. 3 is a flow chart illustrating a process for incorporating ad hoc communications into an activity centric project management tool. Beginning in block 310, a project plan hierarchical display can be loaded and rendered in an activity map for the project plan thereby providing an activity-centric view of a modeled project. In block 320, a particular task node in the hierarchy can be selected for association with an external ad-hoc communication. In block 330, the external ad-hoc communications can be selected for inclusion in the hierarchy. Thereafter, the process can continue through block 340.

In block 340, a role can be chosen for the selected external ad-hoc communication. Generally, the role can be related to the source or the target of the external ad hoc communication. In block 350, a new task node can be created for the hierarchy and the content of the external ad hoc communication can be associated with the node along with the chosen role. Finally, the newly created node can be inserted into the hierarchy in association with the selected node in the hierarchy and the display of the hierarchy can be refreshed in the activity map.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An activity-centric project management tool data processing system comprising:
  an activity-centric project management tool executing in memory of a computer, the tool displaying in a user interface of the computer, an activity map comprising a hierarchy modeling a project plan comprising a table of tasks hierarchically organized into nodes that are individually selectable by a pointing device in the user interface;
  a plurality of ad-hoc communications tools externally coupled to the activity-centric project management tool, the ad-hoc communications tools comprising at least a messenger; and,
  ad hoc communications activity objectification logic coupled to both the activity-centric project management tool and the ad-hoc communications tools, the logic comprising program code enabled during execution in the memory of the computer, to integrate external ad-hoc communications among task nodes of an activity hierarchy modeling a project plan by selecting in response to a pointer selection of a node in the hierarchy, a specific one of the tasks and to insert in the hierarchy as a child of the task, an instance of an external ad-hoc communication comprising a message received by the messenger by associating the instance of the external ad-hoc communication with task meta data in the pointer selected node, and refreshing a display of the activity map in the tool.

2. The system of claim 1, wherein the activity-centric project management tool comprises an activity-centric project management tool user interface, the user interface comprising a table of hierarchically arranged task nodes, each of the nodes providing an indication of a duration, start date and role.

3. The system of claim 2, wherein the user interface further comprises a Gantt chart representative of the table of hierarchically arranged task nodes.

4. The system of claim 2, wherein the ad-hoc communications tools comprise a collaborative instant messenger.

5. The system of claim 2, wherein the ad-hoc communications tools comprise a collaborative screen sharing application.

6. The system of claim 2, wherein the external ad-hoc communications comprise externally produced instant messaging sessions.

7. The system of claim 2, wherein the external ad-hoc communications comprise externally produced requests for approval of a change.

8. The system of claim 7, wherein at least one of the external ad-hoc communications integrated among task nodes comprises an instance of an externally produced request activated to generate a pop-up view of a status for the instance of the externally produced request.

9. A method for integrating external ad-hoc communications in a project plan in a project management tool, the method comprising:
  displaying in a user interface of an activity-centric project management tool executing in memory of a host computing platform, an activity map comprising a hierarchy modeling a project plan comprising a table of tasks hierarchically organized into nodes that are individually selectable by a pointing device in the user interface;

selecting in response to a pointer selection of a node in the hierarchy, a specific one of the tasks and inserting in the hierarchy as a child of the task, an instance of an external ad-hoc communication comprising a message received by a messenger by associating the instance of the external ad-hoc communication with task meta data in the pointer selected node; and refreshing a display of the activity map in the tool.

10. The method of claim 9, wherein the message is externally produced by an instant message session.

11. The method of claim 9, wherein the message is externally produced by a screen sharing session.

12. The method of claim 9, wherein the message is externally produced by a request for approval of a change.

13. The method of claim 9, further comprising rendering a Gantt chart for the hierarchy of nodes inclusive of the task node created for the external ad hoc communication.

14. The method of claim 12, further comprising rendering a pop-up view of a status of the instance of an externally produced relationship requests for approval of a change responsive to a selection of the instance of the externally produced requests for approval of a change.

15. A computer program product comprising a non-transitory computer usable medium embodying computer usable program code for integrating external ad-hoc communications in a project plan in a project management tool, the computer program product comprising:

computer usable program code for displaying in a user interface of an activity-centric project management tool executing in memory of a host computing platform, an activity map comprising a hierarchy modeling a project plan comprising a table of tasks hierarchically organized into nodes that are individually selectable by a pointing device in the user interface;

computer usable program code for selecting in response to a pointer selection of a node in the hierarchy, a specific one of the tasks and inserting in the hierarchy as a child of the task, an instance of an external ad-hoc communication comprising a message received by a messenger by associating the instance of the external ad-hoc communication with task meta data in the pointer selected node; and computer usable program code for refreshing a display of the activity map in the tool.

16. The computer program product of claim 15, wherein the message is externally produced by an instant message session.

17. The computer program product of claim 15, wherein the message is externally produced by a screen sharing session.

18. The computer program product of claim 15, wherein the message is externally produced by a request for approval of a change.

19. The computer program product of claim 15, further comprising rendering a Gantt chart for the hierarchy of nodes inclusive of the task node created for the external ad hoc communication.

20. The computer program product of claim 19, further comprising rendering a pop-up view of a status of the instance of an externally produced relationship requests for approval of a change responsive to a selection of the instance of the externally produced requests for approval of a change.

* * * * *